United States Patent
Beaver

(10) Patent No.: US 11,586,980 B2
(45) Date of Patent: Feb. 21, 2023

(54) IVA PERFORMANCE DASHBOARD AND INTERACTIVE MODEL AND METHOD

(71) Applicant: Verint Americas Inc., Alpharetta, GA (US)

(72) Inventor: Ian Beaver, Spokane Valley, WA (US)

(73) Assignee: Verint Americas Inc., Alpharetta, GA (US)

( * ) Notice: Subject to any disclaimer, the term of this patent is extended or adjusted under 35 U.S.C. 154(b) by 457 days.

(21) Appl. No.: 16/745,490

(22) Filed: Jan. 17, 2020

(65) Prior Publication Data

US 2020/0234190 A1   Jul. 23, 2020

Related U.S. Application Data

(60) Provisional application No. 62/794,103, filed on Jan. 18, 2019.

(51) Int. Cl.
*G06F 3/04812*   (2022.01)
*G06N 20/00*   (2019.01)
(Continued)

(52) U.S. Cl.
CPC ......... *G06N 20/00* (2019.01); *G06F 3/04812* (2013.01); *G06N 3/006* (2013.01); *G06Q 10/04* (2013.01)

(58) Field of Classification Search
CPC .......... G06N 20/00; G06N 3/006; G06N 5/02; G06N 5/022; G06F 3/04812;
(Continued)

(56) References Cited

U.S. PATENT DOCUMENTS 4,914,590 A   4/1990   Loatman et al.
5,631,825 A *   5/1997   van Weele ....... G05B 19/41875
                                                                   700/83
(Continued)

FOREIGN PATENT DOCUMENTS

EP           2752797           7/2014
KR       102219549 B1 *   2/2021
WO   WO-2018174920 A1 *   9/2018   ........... G06F 16/904

OTHER PUBLICATIONS

Search Report, dated Mar. 31, 2020, received in connection with corresponding EP Patent Application No. 20152566.4.
(Continued)

*Primary Examiner* — Steven P Sax
(74) *Attorney, Agent, or Firm* — Meunier Carlin & Curfman LLC

(57) ABSTRACT

Disclosed is a measure to collect and aggregate performance, sales, call center, custom KPI, and WA data in order to construct a model of correlations and causations between metrics to provide a means to measure associated costs of improving performance metrics for use in an interactive planning model. The interactive planning model allows for allocating budget across performance metrics, leveraging correlations and multiple cost models. The information is provided via a dashboard of IVA performance metrics and allows for comparison of real time IVA performance metrics to target metrics set by the IVA owner and incorporating KPIs provided by the WA owners.

20 Claims, 3 Drawing Sheets

(51) Int. Cl.
*G06N 3/006* (2023.01)
*G06Q 10/04* (2023.01)

(58) Field of Classification Search
CPC .. G06F 3/0482; G06F 3/0484; G06F 16/3344; G06F 16/51; G06F 40/20; G06F 16/22; G06F 16/3329; G06F 21/45; G06F 21/64; G06F 3/04847; G06Q 40/02; G06Q 40/08; G06Q 10/0635; G06Q 40/06; G06Q 10/04; G06Q 10/06; H04L 67/306; H04L 43/045; H04L 43/16; H04L 43/08; H04L 41/5009; H04L 51/04; G09B 5/00; G10L 15/18; G10L 15/22; H01J 49/0036; H01J 49/26

See application file for complete search history.

(56) References Cited

U.S. PATENT DOCUMENTS

| | | | |
|---|---|---|---|
| 7,343,197 B2* | 3/2008 | Shusterman | A61B 5/7264 600/509 |
| 7,676,287 B2* | 3/2010 | Eryurek | G05B 23/0221 700/20 |
| 8,364,519 B1 | 1/2013 | Basu et al. | |
| 10,311,376 B2* | 6/2019 | Reddy | G06N 5/02 |
| 10,354,213 B1* | 7/2019 | Ings | G06Q 10/067 |
| 10,460,260 B2* | 10/2019 | Yip | G06Q 10/00 |
| 10,739,944 B1* | 8/2020 | Pasalapudi | G06F 3/0482 |
| 10,863,230 B1* | 12/2020 | Pham | H04N 21/6547 |
| 11,263,056 B2* | 3/2022 | Trowbridge | G06F 9/485 |
| 2004/0073475 A1* | 4/2004 | Tupper | G06Q 10/06 703/2 |
| 2005/0141694 A1 | 6/2005 | Wengrovitz | |
| 2007/0010970 A1* | 1/2007 | Bramwell | G06Q 10/06 702/183 |
| 2010/0033486 A1* | 2/2010 | Dahlen | G06T 11/206 345/440.2 |
| 2011/0238410 A1 | 9/2011 | Larcheveque et al. | |
| 2013/0006707 A1* | 1/2013 | Ssubhanjan | G06Q 30/02 705/7.29 |
| 2014/0278807 A1* | 9/2014 | Bohacek | G06Q 30/0206 705/7.35 |
| 2015/0088783 A1* | 3/2015 | Mun | G06Q 40/02 705/36 R |
| 2015/0339376 A1* | 11/2015 | Wieweg | G06F 16/3344 717/145 |
| 2016/0099892 A1* | 4/2016 | Palakovich | H04L 51/04 709/206 |
| 2016/0283222 A1* | 9/2016 | Yaros | G06F 8/34 |
| 2017/0109799 A1* | 4/2017 | Swinson | G06Q 10/06 |
| 2017/0324866 A1 | 11/2017 | Segre et al. | |
| 2018/0053119 A1 | 2/2018 | Zeng et al. | |
| 2018/0096379 A1* | 4/2018 | Rama | G06Q 10/04 |
| 2018/0123909 A1* | 5/2018 | Venkitapathi | H04L 67/306 |
| 2018/0130463 A1 | 5/2018 | Jeon et al. | |
| 2019/0095425 A1 | 3/2019 | Galitsky et al. | |
| 2019/0156198 A1* | 5/2019 | Mars | G06N 20/00 |
| 2019/0208056 A1* | 7/2019 | Dwane | G06N 20/00 |
| 2019/0265679 A1* | 8/2019 | Takayanagi | G05B 19/418 |
| 2019/0355481 A1* | 11/2019 | Lamb | G06N 7/005 |
| 2019/0362216 A1* | 11/2019 | Stokes | G06Q 40/00 |
| 2020/0099790 A1* | 3/2020 | Ma | G06N 3/08 |

OTHER PUBLICATIONS

Alzona, R., "Call centers predicted to disappear in 10 years," Business Mirror, 2016. Retrieved on Apr. 8, 2020 from http://www.businessmirror.com/ph/2016/05/07/call-centers-predicted-to-disappear-in-10-years, 2016, 2 pages.

Auxbreak Call Center Talk, "The call center industry may come to an end soon—according to some experts," retrieved on Apr. 8, 2020 from http://www.auxbreak.com/call-center-industry-may-come-to-an-end-soon, 2015, 3 pages.

Beaver, I., et al. "Detection of User Escalation in Human-Computer Interactions," INTERSPEECH, 2016, 5 pages.

Caramenico, A., "Aetna improves virtual customer experience," FierceHealthPayer, retrieved on Apr. 8, 2020 from http://fiercehealthpayer.com/story/aetna-improves-virtual-costumer-experience/2013-11-05, 2013, 1 page.

Cifuentes, J., "Introducing the Bots Landscape: 170+ companies, $4 billion in funding, thousands of bots," retrieved on Apr. 7, 2020 from https://venturebeat.com/2016/08/11/introducing-the-bots-landscape-170-companies-4-billion-in-funding-thousands-of-bots, 2016, 9 pages.

Frearson, J., "From New York: How intelligent assistants are cutting customer waiting times," Business Reporter, retrieved on Apr. 8, 2020 from https://web.archive.org/web/20151203115539/http://business-reporter.co.uk/2015/10/15/from-new-york-how-intelligent-assistants-are-cutting-customer-waiting-times/, 2015, 2 pages.

Guynn, J., "Facebook Messenger takes another swipe at bots," retrieved on Apr. 8, 2020 from https://www.usatoday.com/story/tech/news/2017/04/18/facebook-messenger-takes-another-swipe-chat-bots/100596798/, 2017, 3 pages.

Intelligent Virtual Assistant, Technopedia definition, retrieved on Apr. 7, 2020 from https://www.techopedia.com/definition/31383/intelligent-virtual-assistant, 2017, 2 pages.

Kuhn, R., et al., "The Application of Semantic Classification Trees to Natural Language Understanding," IEEE Transactions on Pattern Analysis and Machine Intelligence, vol. 17, No. 5, 1995, pp. 449-460.

Lison, P., "Structured Probabilistic Modelling for Dialogue Management," Ph.D. thesis, University of Oslo, Feb. 2014, 23 pages.

Marois, E., "Using Intelligent Virtual Agents to Improve the Customer Experience: Brains Before Beauty," ICMI Blog, retrieved on Apr. 7, 2020 from http://www.icmi.com/Resources/Self-Service/2013/11/Using-Intelligent-Virtual-Agents-to-Improve-the-Customer-Experience, 2013, 3 pages.

Mittal, V., et al., "Customer satisfaction: A strategic review and guidelines for managers," Marketing Science Institute, 2010, 27 pages.

Xu, H., et al., "LLT-PolyU: Identifying Sentiment Intensity in Ironic Tweets," Proceedings of the 9th International Workshop on Semantic Evaluation (SemEval 2015), Association for Computational Linguistics, 2015, pp. 673-678.

\* cited by examiner

US 11,586,980 B2

IVA PERFORMANCE DASHBOARD AND INTERACTIVE MODEL AND METHOD

CROSS REFERENCE TO RELATED APPLICATIONS

This application is claims priority to U.S. Provisional Patent of Application Ser. No. 62/794,103, filed Jan. 18, 2019, which application is hereby incorporated by this reference in its entirety as if fully set forth herein.

BACKGROUND

An Intelligent Virtual Assistant ("IVA") is "an engineered entity residing in software that interfaces with humans in a human way. This technology incorporates . . . modern artificial intelligence projects to deliver full-fledged 'virtual identities' that converse with users." [1]. IVAs are commonly used for answering questions and task optimization as in the case of Apple's Siri, Microsoft's Cortana, or Google Now. However, many companies are deploying IVAs for efficient problem resolution and cost cutting in call centers and also as the first layer of technical and product support on websites [2]. At the present time many different software companies (close to two hundred, by analysts' estimates [3]) have created IVAs that reside on corporate web pages or otherwise are embedded in advertising and selling efforts. Perhaps the largest gathering of such agents today exists on the Facebook Messenger platform. Through recent APIs provided by Facebook which made creating and deploying agents simple, the number of live "messenger bots," as they are known, has eclipsed 100,000 [4].

In these business domains, IVA accuracy and efficiency directly impacts customer experience and greatly reduces the company support costs. In one case study [5], a Fortune 50 insurance company saw a 29% reduction in live chat volume within five months of deploying an IVA on their website. Domino's Pizza reported that product order time was reduced by 50% when it was done through their IVA [6]. IVAs are so effective that analysts predict that human contact center agents will be completely replaced by IVAs by 2026 [7, 8].

BRIEF SUMMARY OF THE DISCLOSURE

Accordingly, the present invention is directed to IVA performance dashboard and interactive model and method that obviates one or more of the problems due to limitations and disadvantages of the related art.

In accordance with the purpose(s) of this invention, as embodied and broadly described herein, this invention, in one aspect, relates to a graphical user interface including a plurality of display elements displayed on a computing device, the plurality of display elements representing metrics of key performance indicators (KPIs) of an intelligent virtual assistant (IVA), the metrics including a first metric and a second metric, and values of each of the plurality of elements representing aggregated historical data for IVAs of a respective one of the KPIs; each of the plurality of displayed elements adjustable by interaction of a user interacting with the displayed element via the interactive screen; and the first metric being correlated to the second metric such that adjusting a value of a first of the displayed elements representing the first metric causes a change in a value of a second of the displayed elements, wherein the second of the displayed elements represents the second metric.

In another aspect, the invention relates to a method of providing an interactive analysis tool for modeling budget for IVA development across performance metrics. The method includes displaying in a graphical user interface of a computing device a plurality of display elements, the plurality of display elements representing metrics of key performance indicators (KPIs) of an intelligent virtual assistant (IVA), the metrics including a first metric and a second metric, and values of each of the plurality of elements representing aggregated historical data for IVAs of a respective one of the KPIs; adjusting at least one of the plurality of displayed elements by the user interacting with the at least one of the plurality of displayed elements via the graphical user interface; and displaying a dynamic performance model of the IVA defined by the plurality of display elements such that adjusting a value of a first of the displayed elements representing the first metric causes a change in a value of a second of the displayed elements, where the second of the displayed elements represents the second metric.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the IVA performance dashboard and interactive model and method, as well as the structure and operation of the various embodiments of the IVA performance dashboard and interactive model and method, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate an Intelligent Virtual Assistant ("IVA") Performance Dashboard and Interactive Model and Method according to principles described herein. Together with the description, the figures further serve to explain the principles of the IVA performance dashboard and interactive model described herein and thereby enable a person skilled in the pertinent art to make and use the IVA performance dashboard and interactive model.

DETAILED DESCRIPTION

Figure 1:
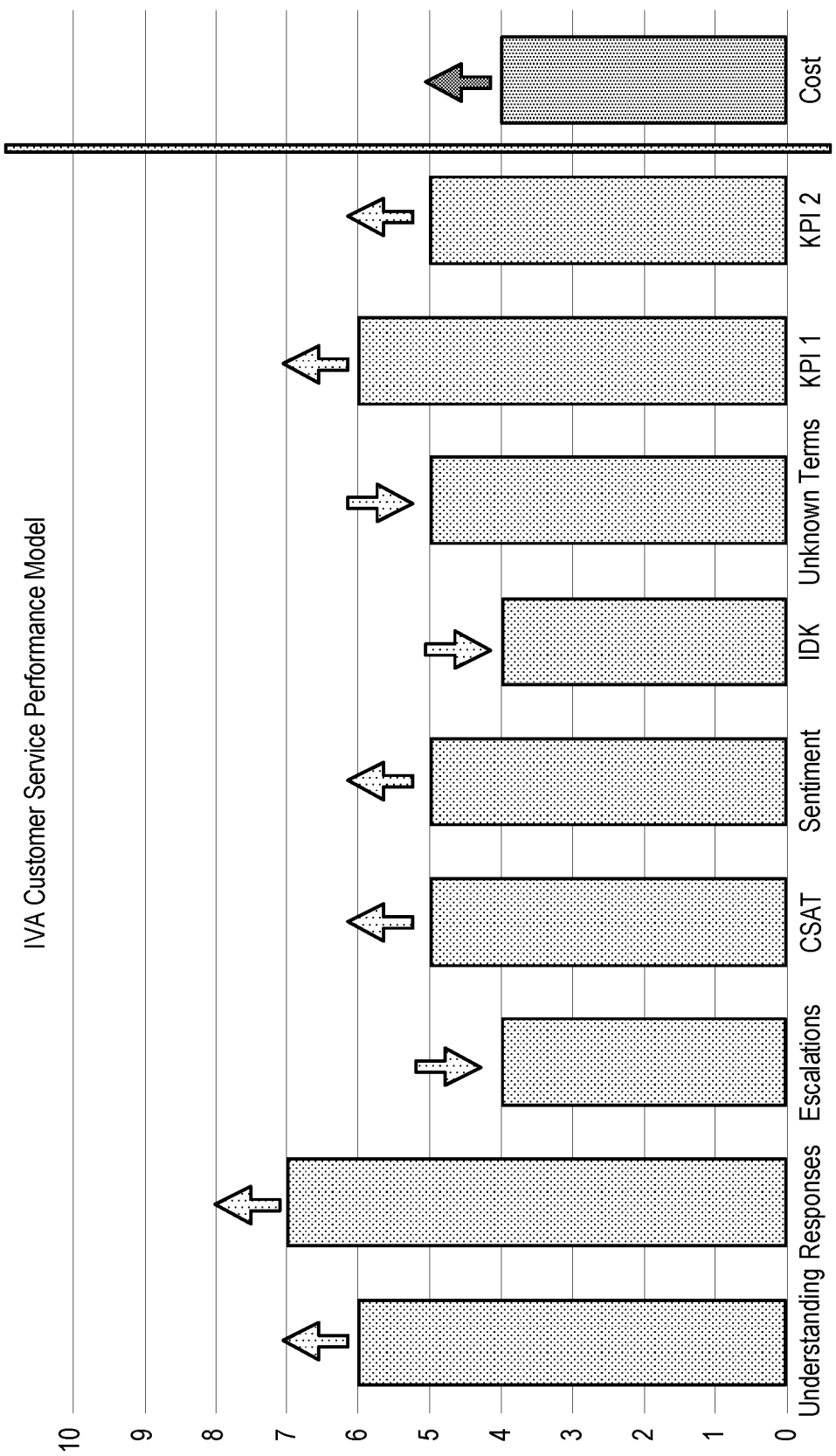
FIG. 1 illustrates an interactive dashboard allowing for adjusting cost and/or performance indicators and viewing changes in correlated performance indicators.

Reference will now be made in detail to embodiments of the IVA performance dashboard and interactive model in a graphical user interface with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Natural Language Understanding

IVAs can be implemented in a multitude of ways, but common to all is a component for Natural Language Understanding (NLU), which is used for the translation of user inputs into a semantic representation [9, 10, 11]. Regardless of the means in which the user is interacting with the WA (keyboard, speech, gestures, etc.), the user input is first converted into text or a numerical feature representation and fed into the NLU for analysis. The NLU maps user inputs, or conversational turns, to a derived semantic representation commonly known as the user intention or simply intent. In the context of Natural Language Processing, intent is an interpretation of a statement or question that allows one to formulate the 'best' response to the statement. The collection syntax, semantics, and grammar rules that defines how input language maps to an intent within the NLU is referred to as a language model (LM). The NLU may perform pre-processing steps such as part-of-speech tagging, stemming, and entity identification (such as proper names or dates) before feeding the text into the language model. Each of these parsers may be trained through machine learning methods or manually constructed by human experts. In order to discover new terms to add to the IVAs knowledge, we monitor several content streams. The first stream is trending topics in social media platforms. These may originate from Twitter, Facebook, Pinterest or similar sites where users are actively communicating around topics. As topics gain popularity, they begin to "trend" by rising to the top of the subjects or topics that people are communicating about.

For example, during the holiday season there are new products such as toys and electronic devices that are released to take advantage of the seasonal increase in consumer spending. Suppose one such product is a new smart phone device such as the Google Pixel. When the device is announced or released, there is a sudden emergence in conversations around the topic of the Pixel, where before the term was not related to the electronics domain at all, or may not have even existed if it is an original name. By monitoring trending topics we will observe a sudden appearance of an unknown term, or a term that is not previously associated to the context it appears in.

In a second example, suppose a tropical storm has appeared and is making landfall. Tropical storms are commonly named and if the storm is expected to have a large impact on a populated area many news sites and therefore social media sites will experience a sudden spike in conversations around this new name. For IVAs in the travel domain, it will be critical that these events are understood quickly as many travelers will begin to ask about disruptions caused by the storm.

Additional content streams can be customer e-mail and live chat transcripts, or any other form of customer to company communication channels. For weather occurrences, feeds such as the NOAA and Weather Channel can be monitored. News sites and aggregates of new feeds can also be ingested. From these sources without the construct of trends, terms can be counted over a sliding time window such as a day or week to create a set of trending terms.

Regardless of the source, when new terminology appears in trends we first consult the existing LM and data models used by the IVA. If the term is unknown to the LM it can indicate a potential to misunderstand users who talk to the IVA about that topic. Therefore it is important to monitor these unknown terms and include them in the LM when it has been determined that the IVA should in fact understand them.

Natural Language Generation

IVAs and other conversational agents rely on Natural Language Generation (NLG) techniques to respond to human users. NLG can be performed using a variety of techniques including but not limited to: static text, static templates rendered with dynamic variables, dynamically composed template or grammar fragments, or fully dynamic text generated by a model trained on domain specific transcripts or texts.

Multimodal interfaces in many websites and applications require responses to not only consist of text, but also web content, pictures, audio, video, and more. In some cases, the conversational agent may provide the information the user requested, but it is in a form that is either difficult to understand or too time consuming for the user to process. This can lead to the user restating their query in the hopes of getting a more concise response.

Escalations

If a human user is unable to perform a task using an IVA they may request to be transferred to a different party to complete their task. These transfers are known as escalations and may occur because of failures in communication or for business rules [12]. An example business rule would be in order to change the name on a plane ticket, the user must talk to a human operator and verify their identity. Only failure driven escalations are considered a negative performance indicator for IVAs.

Customer Feedback

When conversing with an IVA, there are several ways to gather customer feedback such as satisfaction surveys after the conversation is complete (CSAT) [13], asking users to rate each response from the IVA, and monitoring if people completed tasks they started such as purchasing a product they added to their cart or successfully resetting their password. These feedback mechanisms help businesses evaluate the quality of their customer experience and look for ways to improve the IVA.

Sentiment

Another important aspect of customer feedback regardless of channel is their sentiment about the topic. For example, if customers are upset they may use language and tone that will indicate this, even if they do not say outright that the issue is upsetting them. Sentiment analysis aims to identify the polarity (positive or negative) and intensity of certain texts in order to shed light on people's sentiments, perceptions, opinions, and beliefs about a particular product, service, scheme, etc. [14]. By applying sentiment analysis to customer service texts, it is possible to determine if a product or service is upsetting or satisfying customers and to what degree.

Key Performance Indicators

Companies may have several metrics they monitor their customer service department with. These metrics are referred to as key performance indicators and are used to measure the effectiveness of the customer service department as meeting company goals and initiatives. For an IVA these KPIs may be formulated to prevent customers from contacting more expensive channels such as live chat or call centers. Example KPIs for an IVA may be measuring call deflection, volume of customer engagement on a website, time to task resolution, or percentage of returning users. Other KPIs may be sales focused such as percentage of accounts that upgrade to premium service or number of completed product sales through the IVA assistance.

In order for a company to evaluate the benefits of implementing an IVA, particularly suited to KPIs of interest to a specific company. If a company wished to focus on the IVA to perform better in some or all functions, how will that performance affect cost and what other functions may suffer or be traded off for those better performing features?

In the present disclosure, an IVA customer service performance dashboard is presented in a graphical user interface that allows a user to interact with element displayed on the screen to cause changes in displayed elements as described herein. The mechanism of interaction, e.g., touch screen, mouse, keystroke, etc., is not limited hereby and any known means/mechanism of interaction is appropriate for the present application.

Elements displayed as part of the "dashboard" shown via the graphical user interface (screen) correspond to a model of interactions between the graphical elements and measures or indicators underlying the graphical elements. In the present dashboard, the graphical elements represent performance measure and/or costs or resources for developing, implementing or measuring the performance of an interactive voice assistant (IVA). Such dashboard is useful to analyze tradeoffs in IVA features and costs. By modeling the interactions between measures, an interactive model for IVA owners can be created to specify what performance characteristics they want from the IVA, with a clear understanding of the tradeoffs involved to obtain those goals. As the owner adjusts the desired performance characteristic in one area, the model will adjust any related measures automatically, allowing the owner to set realistic performance characteristics for the IVA designers to implement. In certain embodiments, a visual representation of tradeoffs is provided.

Methods

In order to construct a model of the interactions between different metrics data collected from various sources is aggregated. IVA metrics like intent volumes, "I Don't Know" ("IDK") rates, response complexities, and others are taken from IVA reporting databases. Metrics could include, for example, without limitation, understanding, responses, escalations, customer satisfaction, sentiment, and unknown terms. The user inputs can be analyzed for sentiment polarity and unknown terminology. Any external feedback mechanisms like surveys, Customer Satisfaction (CSAT) scores, or call center contacts can be pulled from contact center records associated to the IVA conversations. Social media channels can also be used to gather trending or unknown terminology. IVA development costs can be determined at various levels such as cost to add an intent, include new terminology, refactor or add responses, etc.

Once data is aggregated, multiple variable regression analysis can be done to determine any correlations between the different metrics of IVA performance. In addition, cost models can be constructed of the estimated cost to increase each of the metrics, such as the development improve a single KPI by some measurable amount. These cost models can be normalized across multiple IVAs to produce point level cost increases for each point level increase in a single performance metric.

Using these cost models combined with the regression analysis, we can construct an interactive model for the IVA performance such as the example shown in FIG. 1. In this model, when the IVA owner increases the cost metric on the right hand side, shown as the black arrow, the cost models are used to show the impact on the IVA performance metrics on the left hand side. Notice that by increasing IVA development expenditure, positive metrics such as IVA understanding and response quality will increase, while negative metrics such as IDK rate and escalations will decrease. The IVA development budget on the right hand column will control the maximum values for the performance metrics on the left. For example, if a company is only willing to spend seven cost points for IVA development, it may only be possible to reach nine performance points for IVA understanding, as increasing it further would require more cost than the company is willing to spend.

An interactive dashboard is helpful to a customer trying to make a decision about whether to buy or implement an IVA. The dashboard, once configured, can be used as a visual aid to show how increasing or decreasing cost can affect the various KPIs. The dashboard interactive interface is shown herein as a bar graph, and descriptions herein are made with respect to the features of a bar graph, but the dynamic dashboard interface is not limited to a bar graph. For example a line graph, pie chart or even numeric representation may be used to demonstrate the correlations between KPIs and cost, as described herein.

Referring to FIG. 1, the customer/IVA owner can set a cost allowance for IVA development on the far right. The cost setting sets the limits of possible performance for indicators on the left hand side. The dashboard may allow the customer to move the cost bar up and down such that movement of the cost bar will cause movement up and down in the various KPI bars on the left of the dashboard. That is, the IVA owner sets the Cost allowance for IVA development on the far right, which sets the limits of possible, performance for all indicators on left hand side. The causal relationship between the KPIs and costs are based on relationships established using historical data, e.g., via regression analysis or the like. That is, the dashboard reflects the correlations between KPIs.

A regression analysis, for example, takes into account performance of known indicators. How the indicators are measured may be as they are measured in the art, e.g., counts or other measurement units, scores, values or the like. Regression analysis is applied to measurement or count data from historical IVA users/customers/callers/contacts or the like to determine if a value can predict other KPIs. A strength or coefficient relationship between two or more KPIs can be developed for a particular set of KPIs for an IVA, or IVAs for a specific use. The dashboard dynamic visual interface can then be programmed to implement that coefficient relationship for illustrated KPIs. That is, changes to a bar resulting from moving another bar are based on the strength relationships that are reflected in the coefficient relationships of the various KPIs.

Figure 2:
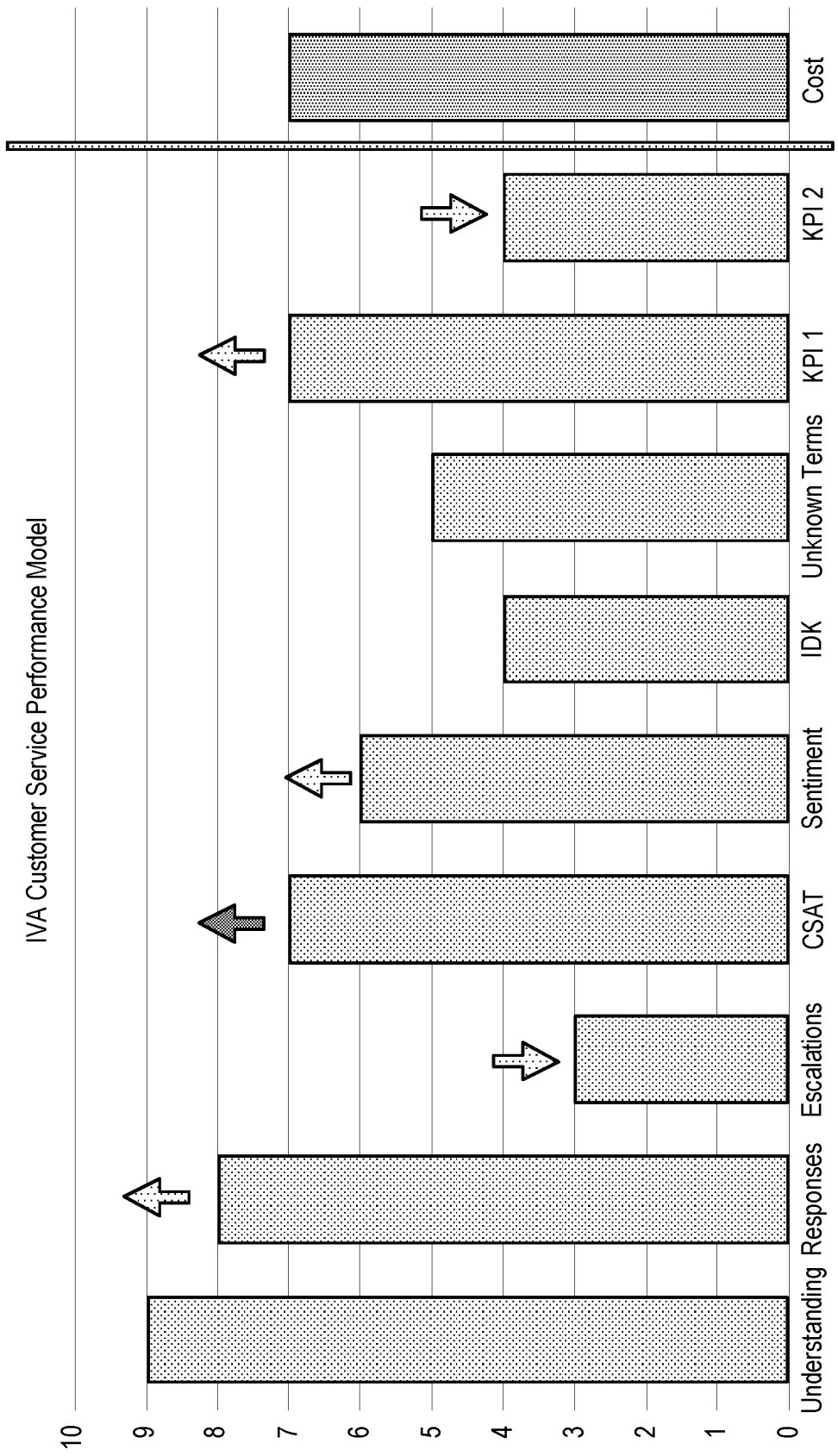
FIG. 2 illustrates an interactive dashboard with a fixed cost allowing for adjusting performance indicators and viewing changes in correlated performance indicators.

For any of the KPIs, the cost bar may be fixed, thus removing cost as a variable in the calculations underlying the results displayed via the bar graph, and allowing the KPI relationships to drive the variability in the outcomes. So, for example, if a customer only wants to spend a certain amount on an IVA, and wishes to maximize performance of a key indicator, the variable bars in the bar chart will adjust to reflect what raising that maximized KPI will have on the other KPIs. For example, referring to FIG. 2, working under the set budget in the Cost column, IVA owner can reallocate budget to increase CSAT metric, which has an impact on the related metrics needed to meet that CSAT performance. For example, as illustrated in FIG. 2, cost can be fixed at 7 and understanding driven to a value of 9. The other variable can then be allowed to move to illustrate which KPIs will suffer because of the fixed costs and understanding emphasis. Max and min values (upper and lower bounds) for some or all of the KPIs will be set in the dashboard based upon the cost column value and then the KPIs can be individually or collectively adjusted and the movement/result in the unadjusted KPIs observed.

Such correlations may also reveal to a customer/IVA owner previously hidden relationships. For example, a customer may wish to minimize escalations, so set that parameter appropriately in the dashboard, but the level of CSAT may also be reduced, which might be a counterintuitive result that is revealed by the use of the dashboard. Such counterintuitive result may be because easy cases were not escalated and only difficult cases would reach a call center, where difficult cases may be likely to receive a low mark for customer satisfaction merely because the case is "difficult." Correlations revealed by the regression analysis thus can be readily seen and understood through use of the present innovative dashboard.

Figure 3:
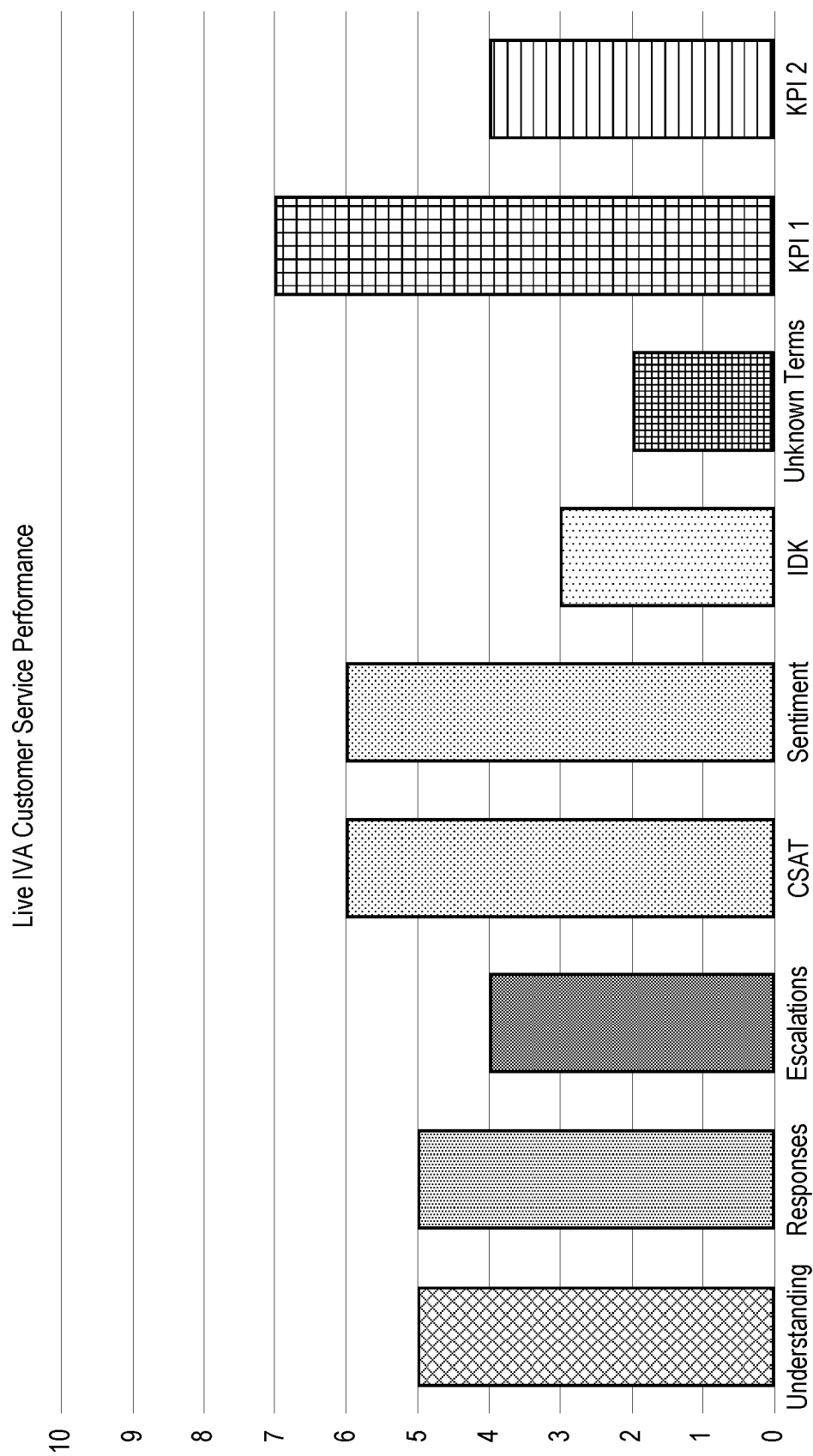
FIG. 3 illustrates an interactive dashboard allowing comparison/overlay of actual performance over desired performance.

Once a cost limit is set, the IVA owner can determine how this cost will be allocated in the design and construction of the IVA. Using the regression models determined by live IVA data, the model can predict how resource allocations in one metric will impact the other metrics. In FIG. 2 we see the user can increase the customer satisfaction (CSAT) scores, shown as the black arrow, which causes increases in metrics that customer satisfaction is dependent on to increase. In this example, to increase CSAT scores, the IVA must have reduced IDK rates, reduced unknown terms, and reduced escalations. It must also have higher quality responses, and customer sentiment must improve. Notice understanding does not increase as it is already high and the customer has not set the cost ceiling on the right side high enough to allow spending more to improve IVA understanding capabilities. E.g., the leftmost bar does not have an arrow as it is showing that not all changes to an indicator result in a change to a different indicator. In that example the understanding is already high enough that it cannot increase further unless the customer increased the cost bar to allow the understanding maximum value to increase Once the IVA owner has set their costs and how they want the cost allocated across all of the IVA performance metrics and their own KPIs, the IVA designers can do the development work necessary to reach those goals. Once the IVA is deployed, the performance of each metric can be monitored real time and compared against the IVA owner-defined performance distribution. This comparison can be shown in a dashboard to the IVA owner, indicating how far of the actual performance of the live IVA is from the targets they set using the model. An example of what this dashboard could look like is shown in FIG. 3. FIG. 3 illustrates "live" or current IVA performance measured against the desired performance specified by the IVA owner. Closer to red colors indicate metrics that are under-performing compared to the target, and closer to green colors indicate metrics that are performing close to targets.

That is, FIG. 3 real time measurement can be overlaid on original desired KPI and cost goals. And provide a "snap shot" of how well the prior bar chart predicted the outcome based on costs and provide a visual of where some KPIs are underperforming/overperforming versus expectation. The IVA design could be modified to adjust to more closely meet the expectations (or the expectations adjusted). In this example, the closer a metric is performing to the target, the more green it appears. The further from the target a metric is, the more red it appears. Colors in the visual representation can be set based on specific customer targets.

Accordingly, the system provides a to collect and aggregate performance, sales, call center, custom KPI, and IVA data in order to construct a model of correlations and causations between metrics.

Accordingly, the presently described system provides a means to measure associated costs of improving performance metrics for use in an interactive planning model. Also provided is an interactive planning model to allocate budget across performance metrics, leveraging correlations and multiple cost models. Similarly, the present dashboard provides a real time dashboard of IVA performance metrics as compared to target metrics set by the IVA owner and incorporating KPIs provided by the IVA owners.

Throughout this application, various publications, as listed below, may have been referenced. The disclosures of these publications in their entireties are hereby incorporated by reference into this application in order to more fully describe the state of the art to which this invention pertains.

REFERENCES

[1] Anonymous. Intelligent virtual assistant. Technopedia, Retrieved Aug. 26, 2016. Available online at https://www-.techopedia.com/definition/31383/intelligent-virtual-assistant.

[2] Erica Marois. Using intelligent virtual agents to improve the customer experience: Brains before beauty. ICMI Blog, 2013. Available online at http://www.icmi.com/Resources/Self-Service/2013/11/Using-Intelligent-Virtual-Agents-to-Improve-the-Customer-Experience.

[3] Jon Cifuentes. Introducing the bots landscape: 170+ companies, $4 billion in funding, thousands of bots. https://venturebeat.com/2016/08/11/introducing-the-bots-landscape-170-companies-4-billion-in-funding-thousands-of-bots/, Retrieved Jan. 9, 2018.

[4] Jessica. Guynn. Facebook messenger takes another swipe at bots., https://www.usatoday.com/story/tech/news/2017/04/18/facebook-messenger-takes-another-swip-chat-bots/100569798, Retrieved Jan. 9, 2018.

[5] Alicia Caramenico. Aetna improves virtual customer experience. Fierce Healthcare, 2013. Available online at http://www.fiercehealthcare. com/payer/aetna-improves-virtual-customer-experience.

[6] Joanne Frearson. From New York: How intelligent assistants are cutting customer waiting times. Business Reporter, 2015. Available online at http://business-reporter-.co.uk/2015/10/15/from-new-york-how-intelligent-assistants-are-cutting-customer-waiting-times.

[7] Auxbreak. The call center industry may come to an end soon according to some experts. Call Center Talk Blog, 2015. Available on-line at http://www.auxbreak.com/call-center-industry-may-come-to-an-end-soon/.

[8] Rodel Alzona. Call centers predicted to disappear in 10 years. Business Mirror, 2016. Available online at http://www.businessmirror.com.ph/2016/05/07/call-centers-predicted-to-disappear-in-10-years/.

[9] Robert B Loatman, Stephen D Post, Chih-King Yang, and John C Hermansen. Natural language understanding system, Apr. 3 1990. U.S. Pat. No. 4,914,590.

[10] Roland Kuhn and Renato De Mori. The application of semantic classification trees to natural language understanding. *IEEE transactions on pattern analysis and machine intelligence*, 17(5):449-460, 1995.

[11] Pierre Lison. *Structured Probabilistic Modelling for Dialogue Management*. PhD thesis, University of Oslo, February 2014.

[12] Ian Beaver and Cynthia Freeman. Detection of user escalation in human-computer interactions. In *INTERSPEECH*, 2016.

[13] Vikas Mittal and Carly Frennea. Customer satisfaction: a strategic review and guidelines for managers. 2010.

[14] Hongzhi Xu, Enrico Santus, Anna Laszlo, and Chu-Ren Huang. Llt-polyu: identifying sentiment intensity in ironic tweets. In *Proceedings of the 9th International Workshop on Semantic Evaluation* (SemEval 2015), *Association for Computational Linguistics*, pages 673-678, 2015.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A graphical user interface, comprising:
   a plurality of graphic, interactive display elements displayed on a screen of a computing device, each of the plurality of graphic, interactive display elements representing a metric of a key performance indicator (KPI) of an intelligent virtual assistant (IVA), wherein visual appearance of respective ones of the plurality of graphic, interactive display elements representing aggregated historical data for IVAs of a respective KPI;
   a first graphic, interactive display element of the plurality of graphic, interactive display elements representing a first metric and spatially-adjustable by interaction of a user interacting with the first graphic, interactive display element via the screen to slide an edge of the first graphic, interactive display element, thereby adjusting an area of the first graphic, interactive display element; and
   the first metric being correlated to a second metric such that spatially adjusting a visual appearance of the first graphic, interactive display element causes a change in a displayed area of a second graphic, interactive display element of the graphic, interactive display elements, wherein the second of the graphic, interactive display elements represents the second metric, wherein correlation of the first metric to the second metric reflects a regression analysis coefficient relationship between the first metric and the second metric.

2. The graphical user interface of claim 1, wherein at least a displayed area of one of the plurality of graphic, interactive display elements is fixed such that the KPI associated with that graphic, interactive display element has a fixed value in the correlation of the first metric to the second metric.

3. The graphical user interface of claim 1, further comprising a graphic, interactive, cost display element, the graphic, interactive, cost display element having a displayed area representing aggregated historical development cost data for IVAs and correlated to at least one of the metrics of key performance indicators such that adjusting the displayed area of the graphic, interactive, cost display element causes a change in a value of at least one of the key performance indicator values and upper and lower bounds of each KPI.

4. The graphical user interface of claim 1, further comprising a graphic, interactive, cost display element, the graphic, interactive, cost display element having a value representing aggregated historical development cost data for IVAs and correlated to at least one of the metrics of key performance indicators such that adjusting the displayed area of one of the graphic, interactive display elements representing that at least one of the metrics of key performance indicators causes a change in a displayed area of the graphic, interactive cost display element.

5. The graphical user interface of claim 1, wherein the first metric is indirectly correlated to the second metric.

6. The graphical user interface of claim 1, further comprising a graphical overlay comprising graphic performance display elements each of the graphic performance display elements of the graphical overlay representing values an actual performance metric of a respective KPI for an existing IVA, the graphical overlay displayed over the plurality of graphic, interactive display elements.

7. The graphical user interface of claim 1, wherein the KPIs include at least one of performance, sales, call center call center deflections, average handle time (AHT), customer engagement time, successful purchases, upsell/cross sell presentations, clicks, transactions, tickets closed, or other company or agency specific metrics.

8. The graphical user interface of claim 1, wherein the metrics include at least one of understanding, responses, escalations, customer satisfaction, sentiment, IDK rates, and unknown terms.

9. The graphical user interface of claim 1, wherein the regression analysis coefficient relationship is based on regression analysis of historical IVA performance statistics.

10. The graphical user interface of claim 1, wherein the plurality of graphic, interactive display elements are display in one of bar chart or a pie chart.

11. A method of providing an interactive analysis tool for modeling budget for IVA development across performance metrics, the method comprising:
    displaying in a graphical user interface of a computing device a plurality of graphic, interactive display elements, each of the plurality of graphic, interactive display elements representing a metric of a key performance indicator (KPI) of an intelligent virtual assistant (IVA), wherein visual appearance values of respective ones of the plurality of graphic, interactive display elements representing aggregated historical data for IVAs of a respective KPI;
    adjusting at least one of the plurality of graphic, interactive display elements by the user sliding an edge of a first graphic, interactive display element of the plurality of the graphic, interactive display elements, thereby adjusting an area of the first graphic, interactive display element, wherein the first graphic, interactive display element represents a first metric; and
    displaying a dynamic performance model of the IVA defined by the plurality of graphic, interactive display elements such that adjusting the area of the first graphic, interactive display elements representing the first metric causes a change in a displayed area of a second graphic, interactive display element of the plurality of the graphic, interactive display elements, where the second graphic, interactive display element represents the second metric, wherein correlation of the first metric to the second metric reflects a regression analysis coefficient relationship between the first metric and the second metric.

12. The method of claim 11, further comprising fixing at least a displayed area of one of the plurality of graphic, interactive display elements such that the KPI associated with that graphic, interactive display element has a fixed value in the correlation of the first metric to the second.

13. The method of claim 11, further comprising displaying a graphic, interactive cost display element in the graphical user interface, the graphic, interactive cost display element having a displayed area representing aggregated historical development cost data for IVAs and correlated to at least one of the metrics of key performance indicators such that adjusting the displayed area of the graphic, interactive cost display element causes a change in a value of at least one of the key performance indicators.

14. The method of claim 11, further comprising displaying a graphic, interactive, cost display element in the graphical user interface, the graphic, interactive, cost display element having a displayed area representing aggregated historical development cost data for IVAs and correlated to at least one of the metrics of key performance indicators such that adjusting the displayed area of one of the graphic, interactive display elements representing that at least one of the metrics of key performance indicators causes a change in a displayed area of the graphic, interactive, cost display element.

15. The method of claim 11, wherein the first metric is indirectly correlated to the second metric.

16. The method of claim 11, further comprising,
displaying a graphical overlay in the graphical user interface, the graphical overlay comprising graphic performance display elements each of the graphic performance display elements of the graphical overlay representing representing an actual performance metric of a respective KPI for an existing IVA, wherein the graphical overlay is displayed over the plurality of graphic, interactive display elements.

17. The method of claim 11, wherein the KPIs include at least one of performance, sales, call center, call center deflections, average handle time (AHT), customer engagement time, successful purchases, upsell/cross sell presentations, clicks, transactions, tickets closed, or other company or agency specific metrics.

18. The method of claim 11, wherein the metrics include at least one of understanding, responses, escalations, customer satisfaction, sentiment, IDK rates, and unknown terms.

19. The method of claim 11, wherein the regression analysis coefficient relationship is based on regression analysis of historical IVA performance statistics.

20. The method of claim 11, wherein displaying in a graphical user interface of a computing device a plurality of graphic, interactive display elements are display in one of bar chart ora pie chart.

* * * * *